United States Patent
Matsumoto et al.

(10) Patent No.: US 10,913,037 B2
(45) Date of Patent: Feb. 9, 2021

(54) OXYGEN CLATHRATE HYDRATE AND OXYGEN SOLUTION CONTAINING THE SAME

(71) Applicant: MEDISCIENCE ESPOIR INC., Kanagawa (JP)

(72) Inventors: Takaaki Matsumoto, Kanagawa (JP); Toshikatsu Hagiwara, Kanagawa (JP); Seitaro Shimizu, Kanagawa (JP); Mariko Takano, Kanagawa (JP)

(73) Assignee: MEDISCIENCE ESPOIR INC., Kangawa (JP)

(*) Notice: Subject to any disclaimer, the term of this patent is extended or adjusted under 35 U.S.C. 154(b) by 0 days.

(21) Appl. No.: 15/539,871

(22) PCT Filed: Dec. 25, 2015

(86) PCT No.: PCT/JP2015/086399
§ 371 (c)(1),
(2) Date: Jun. 26, 2017

(87) PCT Pub. No.: WO2016/104780
PCT Pub. Date: Jun. 30, 2016

(65) Prior Publication Data
US 2017/0341037 A1     Nov. 30, 2017

(30) Foreign Application Priority Data

Dec. 26, 2014  (JP) ................. 2014-266315

(51) Int. Cl.
*B01F 3/04*     (2006.01)
*C02F 1/68*     (2006.01)
(Continued)

(52) U.S. Cl.
CPC ........ *B01F 3/0446* (2013.01); *B01F 3/04617* (2013.01); *B01F 5/12* (2013.01);
(Continued)

(58) Field of Classification Search
None
See application file for complete search history.

(56) References Cited

U.S. PATENT DOCUMENTS 5,261,875 A * 11/1993 Spears ............... A23L 2/54
                                                    604/101.03
6,344,489 B1 * 2/2002 Spears ............... A23L 2/54
                                                    261/107
(Continued)

FOREIGN PATENT DOCUMENTS

| JP | 2002-371389 | 12/2002 |
|----|-------------|---------|
| JP | 2004-205186 | 7/2004  |

(Continued)

OTHER PUBLICATIONS

Mohammadi, et al. "Ice Clathrate Hydrate-Gas phase . . . ". Ind. Eng. Chem. Res. 49. 3976-3979 (2010). (Year: 2010).*

(Continued)

*Primary Examiner* — Sheng H Davis
(74) *Attorney, Agent, or Firm* — Wenderoth, Lind & Ponack, L.L.P.

(57) ABSTRACT

To obtain an oxygen clathrate hydrate containing the dissolved oxygen that is maintained in a state of being dissolved in a solution even when being heated to 100° C.

2 Claims, 8 Drawing Sheets

(51) Int. Cl.
*B01F 5/12* (2006.01)
*C05D 9/00* (2006.01)
*C02F 1/72* (2006.01)
*C02F 1/44* (2006.01)

(52) U.S. Cl.
CPC .................. *C02F 1/68* (2013.01); *C05D 9/00* (2013.01); *B01F 2003/04879* (2013.01); *C02F 1/441* (2013.01); *C02F 1/727* (2013.01)

(56) References Cited

U.S. PATENT DOCUMENTS

2004/0121022 A1  6/2004  Holloway, Jr. et al.
2013/0337081 A1  12/2013  Matsumoto et al.

FOREIGN PATENT DOCUMENTS

JP  2007-268376  10/2007
JP  2014-14358  1/2014

OTHER PUBLICATIONS

International Search Report dated Mar. 15, 2016 in International Application No. PCT/JP2015/086399.

\* cited by examiner

OXYGEN CLATHRATE HYDRATE AND OXYGEN SOLUTION CONTAINING THE SAME

TECHNICAL FIELD

The present invention relates to an oxygen clathrate hydrate and an oxygen solution containing the oxygen clathrate hydrate.

BACKGROUND ART

The present applicant has proposed a technique in which a liquid, gas, or solid phase substance is mixed in, dissolved to, or fractionated into a fluid such as water in Patent Literature 1. According to the technique, for example, in a case of using water and oxygen as the materials, oxygen water having a characteristic that the state of an amount of dissolved oxygen of 25 ppm or more lasts for 35 days or more even under the open atmosphere can be produced.

Further, it has been also confirmed that by drinking the commercially available oxygen water, the increase in the value of $SpO_2$ is not observed even when the amount of dissolved oxygen measured by an existing measurement method is almost the same as that in the oxygen water produced by a gas-liquid mixing device of Patent Literature 1.

CITATION LIST

Patent Literature

Patent Literature 1: WO 2012/081682
Patent Literature 2: JP 2002-371389 A

SUMMARY OF INVENTION

Technical Problem

On the other hand, the present inventors have succeeded in producing a completely new oxygen solution by a new production method obtained by improving conventional methods. Further, the present inventors have found, as a result of the intensive studies on the properties and the like of this new oxygen solution by utilizing the newly established measurement method of an amount of dissolved oxygen, that in the new oxygen solution, dissolved oxygen that has been dissolved without being released in the atmospheric air even when being heated is contained in a large amount.

An object of the present invention is to provide an oxygen clathrate hydrate containing dissolved oxygen that was not able to be measured by a conventional measurement method, by using the amount of dissolved oxygen measured by a newly established dissolved oxygen measurement method as one indicator, and further to provide an oxygen solution in which the oxygen clathrate hydrates are contained in a large amount.

Solution to Problem

The present invention provides the following dissolved oxygen and oxygen solution.

<1> An oxygen clathrate hydrate, including dissolved oxygen that is maintained in a state of being dissolved in a solution even when being heated to 100° C.

<2> An oxygen solution, including the oxygen clathrate hydrate, wherein an amount of the dissolved oxygen is 50 ppm or more.

<3> The oxygen solution according to <1>, wherein the amount of dissolved oxygen is determined by difference (P1−P2) between a numerical value P1 of an amount of dissolved oxygen (ppm) measured by a dissolved oxygen measurement method including the steps of:

(1) adding a deoxidizing amino compound to an oxygen solution, and heating the resultant mixture at a temperature of 80° C. or more;

(2) measuring a concentration of the deoxidizing amino compound contained in the oxygen solution after the step (1); and (3) calculating an amount of dissolved oxygen contained in the oxygen solution before passing through the step (1) from the concentration of the deoxidizing amino compound measured in the step (2), and a numerical value P2 of an amount of dissolved oxygen (ppm) of an oxygen solution measured by a dissolved oxygen measurement method of any one of a diaphragm process, a fluorescence method, and a Winkler method.

<4> An ice, obtained by freezing the oxygen solution.

<5> An oxygen solution, wherein an amount of dissolved oxygen obtained by difference (P1−P2) between a numerical value P1 of an amount of dissolved oxygen (ppm) measured by a dissolved oxygen measurement method including the steps of:

(1) adding a deoxidizing amino compound to an oxygen solution, and heating the resultant mixture at a temperature of 80° C. or more;

(2) measuring a concentration of the deoxidizing amino compound contained in the oxygen solution after the step (1); and (3) calculating an amount of dissolved oxygen contained in the oxygen solution before passing through the step (1) from the concentration of the deoxidizing amino compound measured in the step (2), and a numerical value P2 of an amount of dissolved oxygen (ppm) of an oxygen solution measured by a dissolved oxygen measurement method of any one of a diaphragm process, a fluorescence method, and a Winkler method is 50 ppm or more.

A gas-liquid mixing pump of the present invention is a gas-liquid mixing pump for producing the oxygen solution, and is characterized in that a housing having an approximately disk-shaped outer shape, whose inside is hollow, and a rotor housed in the center of the inside of the housing are provided, the housing has multiple partition walls extending from the outer edge part toward the vicinity of the center of the housing, the rotor has multiple rotor blades raised in a rib shape, and when water containing gas is supplied into the housing and the rotor is rotated, the water containing gas is supplied toward the outer edge side of the housing and super-vibrated by the pressure of the rotor blades, as result, the gas dissolves in the water.

Advantageous Effects of Invention

In the oxygen solution according to the present invention, dissolved oxygen (oxygen clathrate hydrate) that cannot be measured by a conventional measurement method, and is maintained in a dissolved state without being released in the atmospheric air even when being heated is contained in a large amount.

DESCRIPTION OF EMBODIMENTS

Figure 1:
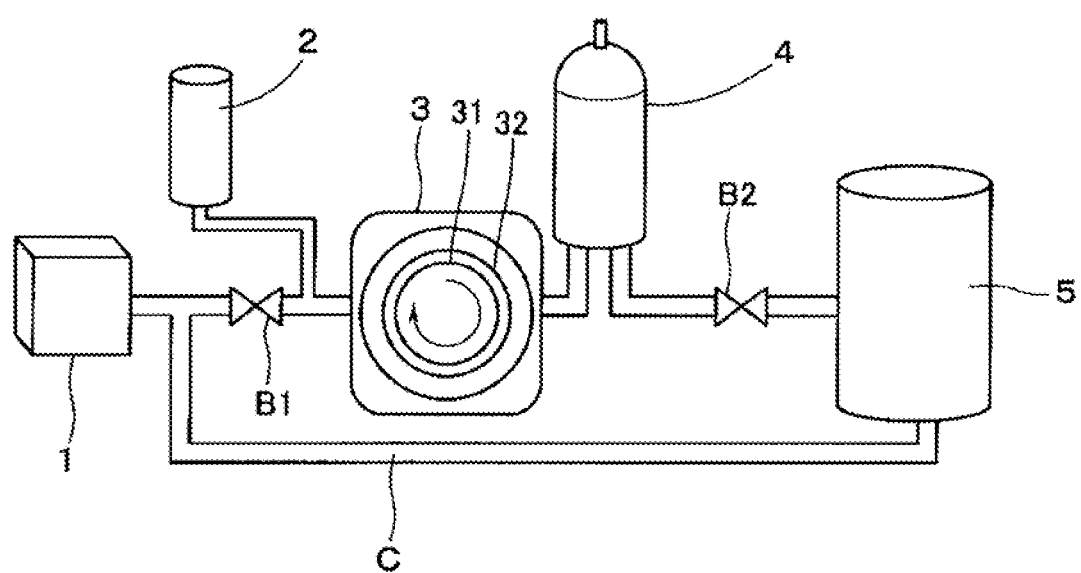
FIG. 1 is a schematic diagram illustrating one embodiment of an oxygen solution production system.

By improving conventional production apparatuses, the present inventors have been succeeded for the first time in obtaining an oxygen solution in which an oxygen clathrate hydrate containing the dissolved oxygen that is maintained in a state of being dissolved in a solution even when being heated to 100° C. is included, and the amount of dissolved oxygen is 50 ppm or more (around 50 ppm to 70 ppm). In addition, by freezing this oxygen solution, an ice containing oxygen can be obtained, and also in this ice, oxygen is contained in a stable state.

It is considered that the dissolved oxygen contained in the oxygen solution according to the present invention is dissolved in a state of an oxygen clathrate hydrate formed by oxygen molecules and water molecules. The "oxygen clathrate hydrate" referred to herein is a compound in a form in which oxygen molecules are surrounded by a lattice of water molecules. In addition, in the oxygen clathrate hydrate contained in the oxygen solution according to the present invention, the dissolved oxygen cannot be measured by a conventional measurement method of an amount of dissolved oxygen, such as a diaphragm electrode method, a Winkler method, or a fluorescence method, and there is a characteristic that the amount of the dissolved oxygen can be measured by a dissolved oxygen measurement method newly established by the present inventors. It is considered that in the oxygen clathrate hydrate according to the present invention, the bonding state and energy state of the molecule are totally different from those of the conventional oxygen water.

Specifically, the dissolved oxygen that is maintained in a state of being dissolved in a solution even when being heated to 100° C., which is contained in the oxygen solution according to the present invention, can be measured by the following dissolved oxygen measurement method devised by the present inventors.

The dissolved oxygen measurement method is a method of measuring the amount of the dissolved oxygen contained in a liquid sample, and includes the following steps:

(1) adding a deoxidizing amino compound to a liquid sample, and adjusting the resultant mixture to a predetermined concentration;

(2) heating the liquid sample containing the deoxidizing amino compound at a temperature of 80° C. or more after the step (1);

(3) measuring a concentration of the deoxidizing amino compound contained in the liquid sample after the step (2); and (4) calculating an amount of the dissolved oxygen contained in the liquid sample of the step (1) from the reaction amount of the deoxidizing amino compound by comparing the concentration of the deoxidizing amino compound measured in the step (3) with the concentration of the deoxidizing amino compound in the step (1).

Hereinafter, each step will be described.

In step (1), a deoxidizing amino compound is added to a liquid sample, and the resultant mixture is adjusted to a predetermined concentration.

The liquid sample is a liquid to be measured for the concentration of dissolved oxygen, and usually oxygen water (oxygen solution) produced by various methods is mentioned. For example, when commercially available oxygen water is selected as the liquid sample, the concentration of dissolved oxygen of the commercially available oxygen water can be accurately measured.

As the deoxidizing amino compound, for example, one or two or more kinds of carbohydrazide, diethylhydroxylamine, hydroxydiaminobenzene, and isopropyl hydroxylamine can be mentioned, among them, carbohydrazide is particularly preferred. For example, as described in Patent Literature 2, or the like, carbohydrazide has been conventionally used as an oxygen scavenger for a plant, a boiler, and the like. In a plant, a boiler, and the like, when a small amount of oxygen is contained in water or the like to be supplied, corrosion of metallic equipment and the like is caused, therefore, it is desired to chemically remove the oxygen with a deoxidizing amino compound such as carbohydrazide. Accordingly, the present inventors focused on the reactivity of the deoxidizing amino compound with oxygen, and newly devised the use of a deoxidizing amino compound for the measurement of the amount of dissolved oxygen.

Specifically, for example, in a case of carbohydrazide, it is known that under the condition of around 135° C. or less, the reaction of the following chemical formula 1 occurs.

$$(N_2H_3)_2CO+2O_2 \rightarrow 2N_2+3H_2O+CO_2 \quad \text{[Chemical Formula 1]}$$

The amount of adding the deoxidizing amino compound into a liquid sample is not specifically limited, and can be adjusted so that for example, the concentration of the deoxidizing amino compound in the liquid sample is 0.01 to 2%. By adding the deoxidizing amino compound so that the concentration of the deoxidizing amino compound falls in this concentration range, the deoxidizing amino compound can be reliably reacted with the oxygen contained in the liquid sample.

In step (2), the liquid sample containing the deoxidizing amino compound is heated at a temperature of 80° C. or more after the step (1).

The heating temperature of the liquid sample containing a deoxidizing amino compound is 80° C. or more, and more preferably in the range of 80° C. to 120° C. The heating time depends on the amount or temperature of the liquid sample, but for example, a range of around 3 to 4 hours in a case of heating a liquid sample to 80° C., and a range of around 30 minutes to 2 hours in a case of heating to 100° C. can be used as a guide.

In a case where the deoxidizing amino compound is carbohydrazide, according to this step (2), the oxygen in the liquid sample is reacted with the carbohydrazide as shown in the chemical formula 1.

In step (3), a concentration of the deoxidizing amino compound contained in the liquid sample is measured after the step (2).

A method for measuring the concentration of the deoxidizing amino compound is not particularly limited, and a known method such as an iodine titration method (redox titration method) can be appropriately employed.

In step (4), an amount of the dissolved oxygen contained in the liquid sample of the step (1) is calculated from the reaction amount of the deoxidizing amino compound by comparing the concentration of the deoxidizing amino compound measured in the step (3) with the concentration of the deoxidizing amino compound in the step (1).

As in the carbohydrazide shown in the chemical formula 1, the deoxidizing amino compound reacts with the oxygen in a liquid sample under a predetermined temperature condition, therefore, in consideration of the reaction formula, the amount of the dissolved oxygen contained in a liquid sample can be calculated from the concentrations of the deoxidizing amino compounds before and after the reaction.

In the dissolved oxygen measurement method of the present invention, by heating a liquid sample, all of the oxygen contained in the liquid sample is taken out and can be reacted with a deoxidizing amino compound (step (2)), therefore, for example, the amount of dissolved oxygen of the oxygen solution (liquid sample) containing dissolved oxygen, which has not been measured by a conventional measurement method, can be accurately measured.

From the previous studies, for example, it is considered that in the oxygen solution produced by such a method, oxygen molecules are stably dissolved in a form of an oxygen clathrate hydrate in which oxygen molecules are surrounded by a lattice of water molecules. For this reason, for example, by a conventional method such as a diaphragm electrode method, a Winkler method, or a fluorescence method, all of the oxygen dissolved in a state of an oxygen clathrate hydrate in oxygen water cannot be measured, and it is considered that the amount of the dissolved oxygen originally contained in oxygen water cannot be measured.

In contrast, in the dissolved oxygen measurement method, since the liquid sample (oxygen water) is heated to react with the deoxidizing amino compound (step (2)), the oxygen dissolved in a state of an oxygen clathrate hydrate in the liquid sample (oxygen water) is taken out, and the amount of dissolved oxygen, which was not able to be measured by a conventional measurement method, can be accurately measured.

Therefore, by using this dissolved oxygen measurement method, the difference $P1-P2 \geq 50$ (ppm) occurs between the numerical value P1 of the concentration of dissolved oxygen, which is shown when the concentration of dissolved oxygen of the oxygen solution according to the present invention is measured, and the numerical value P2 of the concentration of dissolved oxygen, which is measured by a conventional method such as a diaphragm electrode method, a Winkler method, or a fluorescence method. Accordingly, the fact that there is such a difference between P1 and P2 indicates that in the oxygen solution according to the present invention, oxygen clathrate hydrates in which oxygen that was not able to be measured by a conventional measurement method, that is, oxygen molecules are surrounded by a lattice of water molecules are dissolved in an amount of 50 ppm or more.

Further, the procedures of the measurement method of the "oxygen clathrate hydrate formed by oxygen molecules and water molecules" will be described in more detail by taking a form of using carbohydrazide as the deoxidizing amino compound as an example.

More specifically, the "dissolved oxygen that is maintained in a state of being dissolved in a solution even when being heated to 100° C.", which is contained in the oxygen solution of the present invention can be measured by the following procedures.

(A) With respect to the oxygen solution to be measured, the amount of dissolved oxygen P2 (ppm) is measured by a dissolved oxygen measurement method such as a conventional diaphragm process.

(B) Carbohydrazide is added to the oxygen solution at room temperature so that the concentration of the carbohydrazide is 0.01 to 2%.

(C) The resultant oxygen solution of (B) is heated, and the carbohydrazide is reacted with the oxygen at a temperature of 80° C. or more for 10 minutes or more.

(D) After the step (C), the concentration of the carbohydrazide contained in the oxygen solution is measured by an iodine titration method.

(E) The amount of the dissolved oxygen P1 (ppm) contained in the oxygen solution is calculated from the reaction amount of the carbohydrazide by comparing the concentration of the carbohydrazide measured in the step (D) with the concentration of the carbohydrazide prepared in the step (B).

(F) The amount of the oxygen clathrate hydrates formed by oxygen molecules and water molecules is determined from the difference (P1−P2) between the P1 calculated in the above step (5) and the P2 measured in the above step (1).

Hereinafter, such a method may be referred to as a "carbohydrazide method".

Further, it has been confirmed that the oxygen solution of the present invention is maintained in a state in which oxygen is dissolved in a solution even when being heated to 100° C. This indicates that in the oxygen solution of the present invention, dissolved oxygen is extremely stably retained in water as an oxygen clathrate hydrate. In addition, the oxygen solution from which oxygen is not released in the atmospheric air even under such a high temperature, has not been known at all in the past.

Next, one embodiment of an oxygen solution production system for producing the oxygen solution according to the present invention will be described.

FIG. 1 is a schematic diagram illustrating one embodiment of an oxygen solution production system.

The gas-liquid mixing system S illustrated in FIG. 1 includes an RO (reverse osmosis) water storage tank 1, an oxygen supply cylinder 2, a gas-liquid mixing pump 3, a gas-liquid separator 4, and a water storage tank 5 for oxygen solution.

In the RO water storage tank 1, pure water (RO water) obtained through a reverse osmosis membrane is stored. The reverse osmosis membrane has a property that water is allowed to pass through and impurities other than water, such as ions, and salts are not allowed to pass through, and a reverse osmosis membrane having a preferred pore size of around 2 nm or less can be mentioned. Examples of the structure of reverse osmosis membrane include various kinds of structures of a hollow fiber membrane, a spiral membrane, a tubular membrane, and the like, and examples of the material of reverse osmosis membrane include cellulose acetate, aromatic polyamide, polyvinyl alcohol, and polysulfone. Further, the RO water to be stored in the RO water storage tank 1 may be the one obtained by using a commercially available known RO water production apparatus. Temperature of the RO water supplied from the RO water storage tank 1 can be set to around 15° C. to 25° C.

The RO water storage tank 1 is connected to a gas-liquid mixing pump 3 on the downstream side. An oxygen supply cylinder 2 is connected to a flow path between the RO water storage tank 1 and the gas-liquid mixing pump 3. Further, a pressure regulating valve B1 is arranged in a flow path on the upstream side of the oxygen supply cylinder 2.

The oxygen supply cylinder 2 injects oxygen into the water (RO water) from the RO water storage tank 1. The oxygen supply cylinder 2 is not specifically limited, and a commercially available known one can be appropriately used. The amount of oxygen to be injected, the pressure, and the like can be appropriately designed.

Into the gas-liquid mixing pump 3, water containing the oxygen injected from the oxygen supply cylinder 2 flows. As to the gas-liquid mixing pump 3, for example, a gas-liquid mixing pump in a form in which a rotor 31 having rotor blades (impeller) is housed in a housing 32 can be mentioned, and capable of force-feeding the oxygen-containing water at a pressure of around 0.1 Mpa to 10 Mpa is preferred. In a case of the gas-liquid mixing pump 3 in this form, oxygen and water can be kneaded by the rotation of the rotor blades (impeller) 31.

FIGS. 2(A) to 2(C) are diagrams illustrating one embodiment of a gas-liquid mixing pump included in the oxygen solution production system illustrated in FIG. 1.

FIG. 2(A) is an internal perspective view illustrating one embodiment of the rotor of the gas-liquid mixing pump. FIG. 2(B) is a longitudinal sectional view showing a cross section taken along the line D-D' of FIG. 2(A). FIG. 2(C) is an internal perspective view illustrating one embodiment of the housing of the gas-liquid mixing pump.

As shown in FIGS. 2(A) to 2(C), the present inventors have newly produced a gas-liquid mixing pump for producing the oxygen solution according to the present invention.

The gas-liquid mixing pump 3 is provided with a housing 32 and a rotor 31.

As illustrated in FIGS. 2(A) and 2(B), the rotor 31 is provided with a columnar rotating shaft part 31a located at the center, an expansion part 31b extending downward from the lower end of the rotating shaft part 31a and expanding outward, and rib-shaped rotor blades 31c each of which rises upward from the expansion part 31b. The rotor blade 31c extends from the rotating shaft part 31a at the center toward the outer edge of the expansion part 31b, and in the embodiment illustrated in FIGS. 2(A) and 2(B), eight rotor blades 31c are formed. Further, the rotor blades 31c have a certain height, and are formed with the outer ends standing substantially vertically, and further with being slightly outwardly inclined with respect to the center of the rotating shaft part 31a.

The housing 32 has an approximately disk-shaped outer shape, and is a hollow body having a space inside the body. A supply path L1 is connected to the upper surface side of the housing 32, and a water discharge path L2 is connected to the lower surface side opposite to the supply path L1. An oxygen supply port L3 connected to the oxygen supply cylinder 2 is provided on the supply path L1. In the gas-liquid mixing pump 3, oxygen is added to the water flowing through the supply path L1 from the oxygen supply port L3, and water containing the oxygen is supplied into the housing 32.

In the vicinity of the center of the outside of the housing 32, a cylindrical bearing part 32a that protrudes toward the outside is arranged, and an approximately circular storage space S that corresponds to the shape of the rotor 31 is formed around the bearing part 32a. The rotating shaft part 31a of the rotor 31 is inserted into the inside of the bearing part 32a of the housing 32, and a rotor 31 is arranged in the center of the housing 32.

In the housing 32, multiple partition walls 32c each of which extends from the outer edge part 32b to the vicinity of the storage space S in the center are formed. Each of the partition walls 32c is formed in a tapered shape that narrows in width as extending from the outer edge part 32b to the center side. Further, the adjacent partition walls 32c are connected to each other via a curved surface 32d that curves outwardly.

In the gas-liquid mixing pump 3, when the oxygen-containing water is supplied into the housing 32 and the rotor 31 rotates, the water is swept away toward the outer edge part 32b side of the housing 32 while being stirred by the rotary blades 31c. The oxygen-containing water supplied from the rotor 31 toward the outer edge part 32b of the housing 32 is further stirred in the vicinity of the curved surface 32d, and oxygen and water are effectively and homogeneously dispersed and mixed, therefore, an oxygen clathrate hydrate formed by oxygen molecules and water molecules can be generated. The oxygen solution containing the oxygen clathrate hydrates formed by oxygen molecules and water molecules flows out from the water discharge path L2 and is supplied to the gas-liquid separator 4.

In addition, for example, it can be mentioned that the diameter of the housing is preferably in the range of 200 to 300 mm, and the diameter of the rotor is preferably in the range of 80 to 150 mm.

Further, the number and form of the rotary blades 31c of the rotor 31, the rotation speed of the rotor 31, and the like can also be appropriately designed in consideration of the size and shape of the housing 32, the water content, the oxygen content, and the like. Furthermore, the gas-liquid mixing pump 3 can also dissolve gases other than oxygen into water.

The gas-liquid separator 4 is connected to the gas-liquid mixing pump 3 on the upstream side and is connected to the water storage tank 5 on the downstream side. Further, between the gas-liquid separator 4 and the water storage tank 5, a pressure regulating valve B2 is provided.

Figure 3:
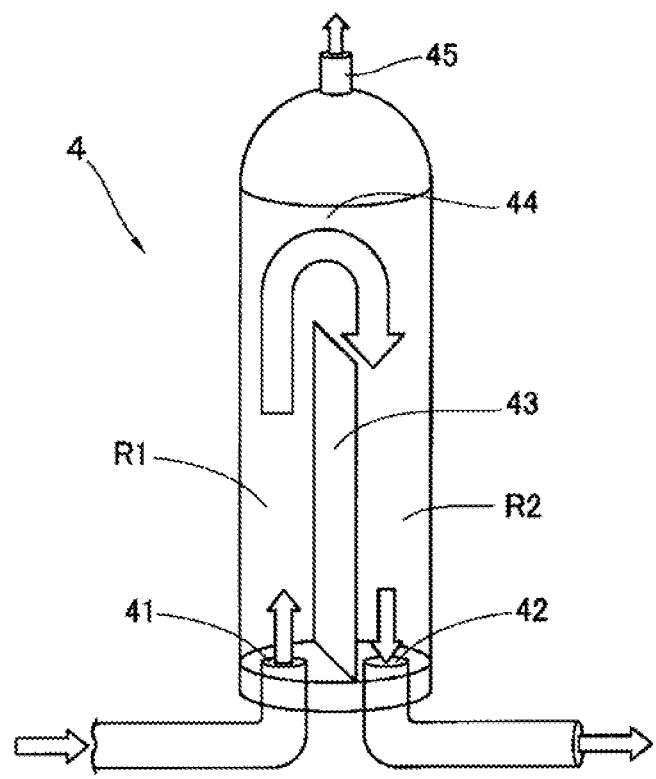
FIG. 3 is an internal perspective view illustrating one embodiment of a gas-liquid separator included in the oxygen solution production system.

FIG. 3 is an internal perspective view illustrating one embodiment of a gas-liquid separator included in the oxygen solution production system.

The gas-liquid separator 4 has a vertically-long approximately cylindrical shape, and at the bottom part of the gas-liquid separator 4, an inflow port 41 connected to the gas-liquid mixing pump 3, and an outflow port 42 connected to the water storage tank 5 are arranged. The inside of the gas-liquid separator 4 is partitioned into a first chamber R1 including the inflow port 41 and a second chamber R2 including the outflow port 42 with a partition plate 43 standing from the bottom in the vicinity of the center. As the material of the partition plate 43, various kinds of metals and the like can be mentioned. In addition, a communication part 44 is formed above the partition plate 43 such that the first chamber R1 and the second chamber R2 communicate with each other. Further, in the upper part of the gas-liquid separator 4, a discharge part 45 for discharging gas is arranged.

In addition, the oxygen solution force-fed by the gas-liquid mixing pump 3 flows into the inside of the gas-liquid separator 4 from the inflow port 41 and rises in the first chamber R1. Further, when the oxygen solution falls down in the second chamber R2 beyond the upper end of the partition plate 43 through the communication part 44, turbulence occurs, therefore, oxygen and water are further mixed. Furthermore, the excessive oxygen that has not dissolved in water rises up as air bubbles when rising in the first chamber R1, is gas-liquid separated when the oxygen solution falls down in the second chamber R2 beyond the upper end of the partition plate 43, and is discharged from the discharge part 45 to the outside. The generated oxygen solution flows out to the water storage tank 5 through the flow path from the outflow port 42.

The water storage tank 5 is connected to the flow path between the RO water storage tank 1 and the gas-liquid mixing pump 3 via a circulation flow path C. Therefore, the oxygen solution discharged from the water storage tank 5 can be supplied again as needed on the upstream side of the gas-liquid mixing pump 3. By such re-supply of the oxygen solution, injection of oxygen from the oxygen supply cylinder 2, kneading by the gas-liquid mixing pump 3, gas-liquid separation by the gas-liquid separator 4, and the like are performed again, therefore, the stability and concentration of the dissolved oxygen in the oxygen solution can be increased.

In such an oxygen solution production system, for example, by performing the circulation of an oxygen solution in the range of around 10 minutes to 30 minutes, an oxygen solution, which includes oxygen clathrate hydrates containing the dissolved oxygen that is maintained in a state of being dissolved in a solution even when being heated to 100° C., and has the dissolved oxygen in an amount of 50 ppm or more, can be produced.

Note that the gas-liquid mixing system is not limited to the above-described embodiment, and may include a gas mixing ratio adjusting mechanism, a valve, a filter, and the like.

As described above, the oxygen solution according to the present invention, which is produced by the oxygen solution production system including a gas-liquid mixing pump, is easily absorbed into the body, and by drinking the oxygen solution, the oxygen can be readily taken into the body, as a result, $SpO_2$ (arterial oxygen saturation) in the blood can be increased.

Therefore, in a case where the oxygen solution according to the present invention is used as a beverage, the beverage can be constituted only of the oxygen solution, or various additives can be mixed within the range not inhibiting the effect of the oxygen. Specific examples of the additive include citric acid-Na, citric acid-K, sucrose, coenzyme Q-10 (water soluble, manufactured by Nisshin Pharma Inc.), taurine, various amino acids, glucose, fructose, xylitol, dextrin, sodium, potassium, calcium, magnesium, vanadium, iron, citric acid, malic acid, and amino acid.

EXAMPLES

Hereinafter, the oxygen solution according to the present invention will be described in more detail by referring to Examples, however, the present invention is not limited at all by the following Examples.

<Comparative Example 1> Measurement of the Amount of Dissolved Oxygen 1

With respect to commercially available oxygen waters A and B, the amount of dissolved oxygen after opening the oxygen water was measured. The commercially available oxygen water A was indicated as "dissolved oxygen 150 ppm", but the amount of the dissolved oxygen decreased to 30 ppm immediately after the opening. Further, the commercially available oxygen water B was indicated as "dissolved oxygen 120 ppm", but the amount of the dissolved oxygen decreased to 35 ppm immediately after the opening.

With respect to the commercially available oxygen waters A and B, the amount of dissolved oxygen was measured by a carbohydrazide method and a fluorescence method.

(1) In the carbohydrazide method, carbohydrazide (0.1 g) was added into commercially available oxygen water A (500 ml) immediately after the opening, and then the resultant mixture was heated at 80° C. for 4 hours to react the dissolved oxygen in the oxygen water with the carbohydrazide. After that, when the concentration of the carbohydrazide was measured by an iodine titration method, it was confirmed from the reaction amount of the carbohydrazide that the amount of the dissolved oxygen contained in the oxygen water A was 30 ppm. Further, when the amount of the dissolved oxygen in the commercially available oxygen water A was measured by using a fluorescent dissolved oxygen meter (ProODO manufactured by YSI Inc.), it was confirmed that the amount of the dissolved oxygen contained in the oxygen water A was 30 ppm.

That is, the oxygen water A has no difference between the numerical value P1 of the amount of dissolved oxygen measured by a carbohydrazide method and the numerical value P2 of the amount of dissolved oxygen measured by a fluorescence method, and it was confirmed that all of the dissolved oxygen can be measured by a conventional method (oxygen dissolved in a form of an oxygen clathrate hydrate was not present). (2) In the carbohydrazide method, carbohydrazide (0.1 g) was added into commercially available oxygen water B (500 ml) immediately after the opening, and then the resultant mixture was heated at 80° C. for 4 hours to react the dissolved oxygen in the oxygen water with the carbohydrazide. After that, the concentration of the carbohydrazide was measured by an iodine titration method, and it was confirmed from the reaction amount of the carbohydrazide that the amount of the dissolved oxygen contained in the oxygen water B was 35 ppm. Further, when the amount of the dissolved oxygen in the commercially available oxygen water B was measured by using a fluorescent dissolved oxygen meter (ProODO manufactured by YSI Inc.), it was confirmed that the amount of the dissolved oxygen contained in the oxygen water B was 35 ppm.

That is, the oxygen water B has no difference between the numerical value P1 of the amount of dissolved oxygen measured by a carbohydrazide method and the numerical value P2 of the amount of dissolved oxygen measured by a fluorescence method, and it was confirmed that all of the dissolved oxygen can be measured by a conventional method (oxygen dissolved in a form of an oxygen clathrate hydrate was not present).

<Example 1> Measurement of the Amount of Dissolved Oxygen 2

Figure 2:
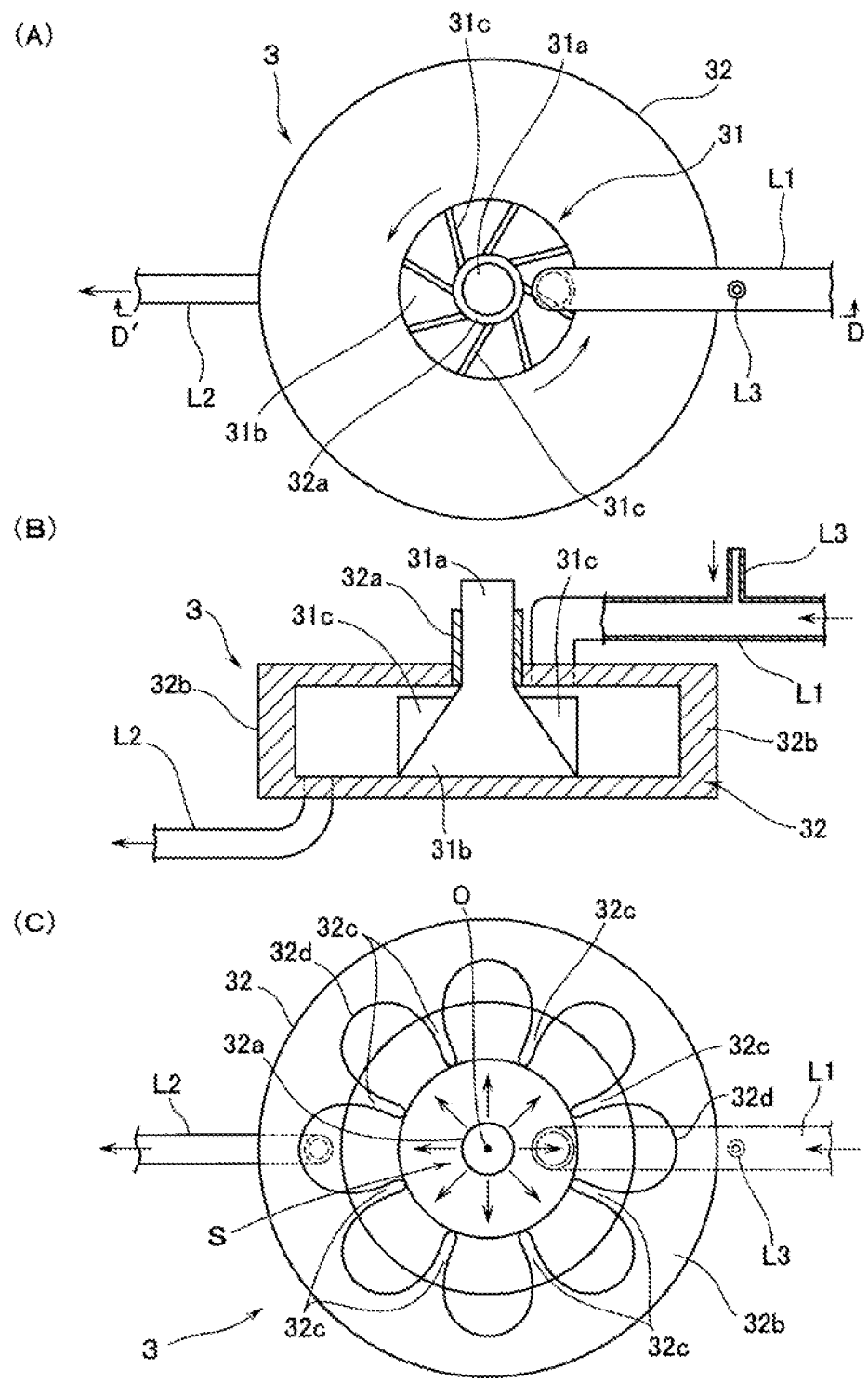
FIGS. 2(A) to 2(C) are diagrams illustrating one embodiment of a gas-liquid mixing pump included in the oxygen solution production system illustrated in FIG. 1.

An oxygen solution was produced by utilizing an oxygen water production system that had been described with reference to FIGS. 1 to 3 (samples F to J). With respect to the oxygen solution (samples F to J), the amount of dissolved oxygen was measured by a conventional method such as a diaphragm process, a fluorescence method, and a Winkler method, and a carbohydrazide method that had been devised by the present inventors.

In the diaphragm process, a diaphragm type galvanic cell type oxygen concentration meter (DO-31P manufactured by DKK-TOA CORPORATION) was used.

In the carbohydrazide method, into the oxygen solution produced by an oxygen water production system that had been described with reference to FIGS. 1 to 3 (samples F to J, 500 ml), carbohydrazide (0.1 g) was added as a deoxidizing amino compound, and then the resultant mixture was heated at 80° C. for 4 hours to react the dissolved oxygen in the oxygen water with the carbohydrazide. After that, when the concentration of the carbohydrazide was measured by an iodine titration method, it was confirmed from the reaction amount of the carbohydrazide that the amount of the dissolved oxygen contained in the oxygen water was as follows: sample F: 93.6 ppm, sample G: 81.0 ppm, sample H: 92.2 ppm, sample I: 90.5 ppm, and sample J: 92.1 ppm.

On the other hand, with respect to the oxygen solution (samples F to J), when the amount of dissolved oxygen was measured by a diaphragm process, the following results were obtained: sample F: 39.0 ppm, sample G: 30.4 ppm, sample H: 33.2 ppm, sample I: 32.5 ppm, and sample J: 31.2 ppm. Further, also in a case where the amount of dissolved oxygen was measured by a fluorescence method (fluorescent dissolved oxygen meter (ProODO manufactured by YSI Inc.)), substantially the same values were obtained.

The above results are summarized in Table 1.

TABLE 1

|  | Diaphragm process (P2) | Carbohydrazide method (P1) | P1 − P2 |
| --- | --- | --- | --- |
| Sample F | 39.0 ppm | 93.6 ppm | 54.6 ppm |
| Sample G | 30.4 ppm | 81.0 ppm | 50.6 ppm |
| Sample H | 33.2 ppm | 92.2 ppm | 59.0 ppm |
| Sample I | 32.5 ppm | 90.5 ppm | 58.0 ppm |
| Sample J | 31.2 ppm | 92.1 ppm | 60.9 ppm |

In the measurement results of the amount of dissolved oxygen of the oxygen solution produced by utilizing an oxygen water production system that had been described with reference to FIGS. 1 to 3, it was confirmed that there was a difference of 50 ppm or more (50.6 ppm to 60.9 ppm) between the numerical value P1 of the amount of dissolved oxygen obtained by a carbohydrazide method and the numerical value P2 of the amount of dissolved oxygen obtained by a fluorescence method.

That is, it is shown that in the oxygen solution according to the present invention, the oxygen clathrate hydrates formed by oxygen molecules and water molecules are present in an amount of 50 ppm or more as the potential dissolved oxygen that was not able to be measured by a conventional diaphragm process or fluorescence method.

It was confirmed that in the oxygen solution according to the present invention, the oxygen clathrate hydrates formed by oxygen molecules and water molecules are contained in an amount of 50 ppm or more, and a large amount of oxygen clathrate hydrates are stably contained even as compared with the oxygen water produced by the gas-liquid mixing device described in Patent Literature 1.

<Example 2> Investigation of Influence by Heat Treatment (1) Test Method

With respect to the oxygen solution produced by utilizing an oxygen water production system that had been described with reference to FIGS. 1 to 3, the influence by heat treatment was investigated. Specifically, the investigation was performed by the following procedures.

(a) Three liters of the sample (oxygen solution) was placed in an Erlenmeyer flask, and the water temperature was measured by a thermometer while being opened.

(b) An asbestos wire gauze was placed on a cassette gas stove, the Erlenmeyer flask in which the sample had been placed was placed on the asbestos wire gauze, and the heating was started.

(c) The temperature of the sample reached 100° C. in around 35 to 40 minutes. The heating was stopped after 3 minutes from the time point of reaching 100° C., and the Erlenmeyer flask was quickly removed from the gas stove and cooled with tap water. The Erlenmeyer flask was cooled for around 20 minutes, taken out at the time point when the water temperature decreased to 20° C., and left to stand.

(e) The resultant sample was filled in a sample container (made of PET, 500 ml), and the oxygen amount was measured by a fluorescence method (measurement instrument: ProODO manufactured by YSI Inc.), and a carbohydrazide method in the similar manner as in Examples 1 and 2.

(2) Results

Figure 4:
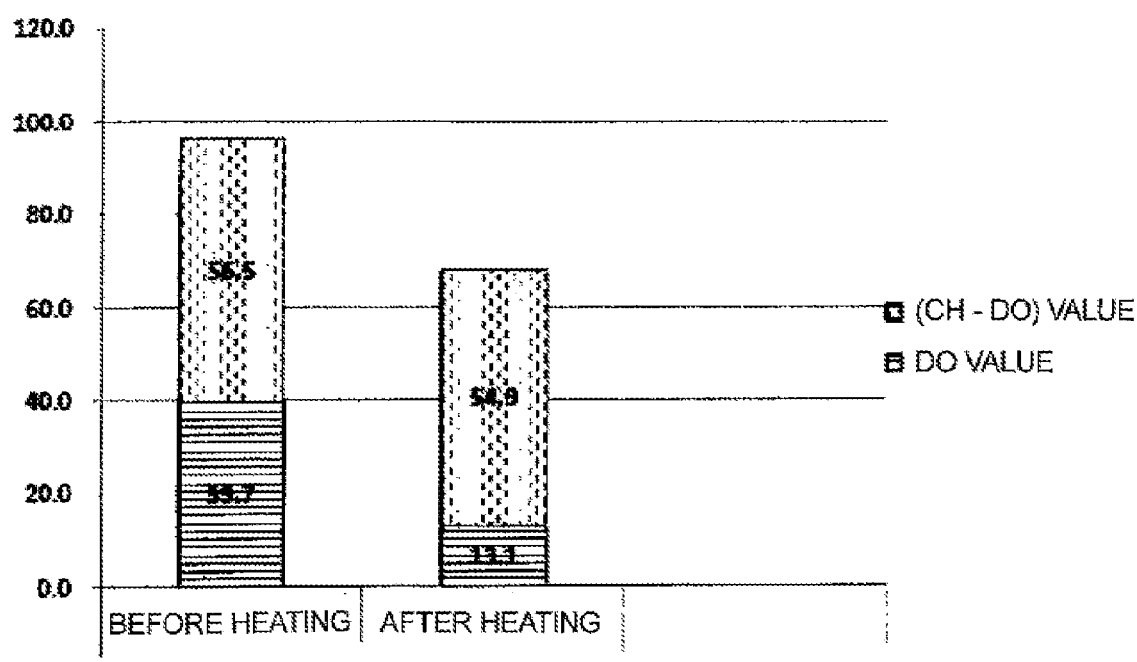
FIG. 4 is a graph showing the results of the measurements of the oxygen amount in the oxygen solutions before heating and after heating.
Figure 5:
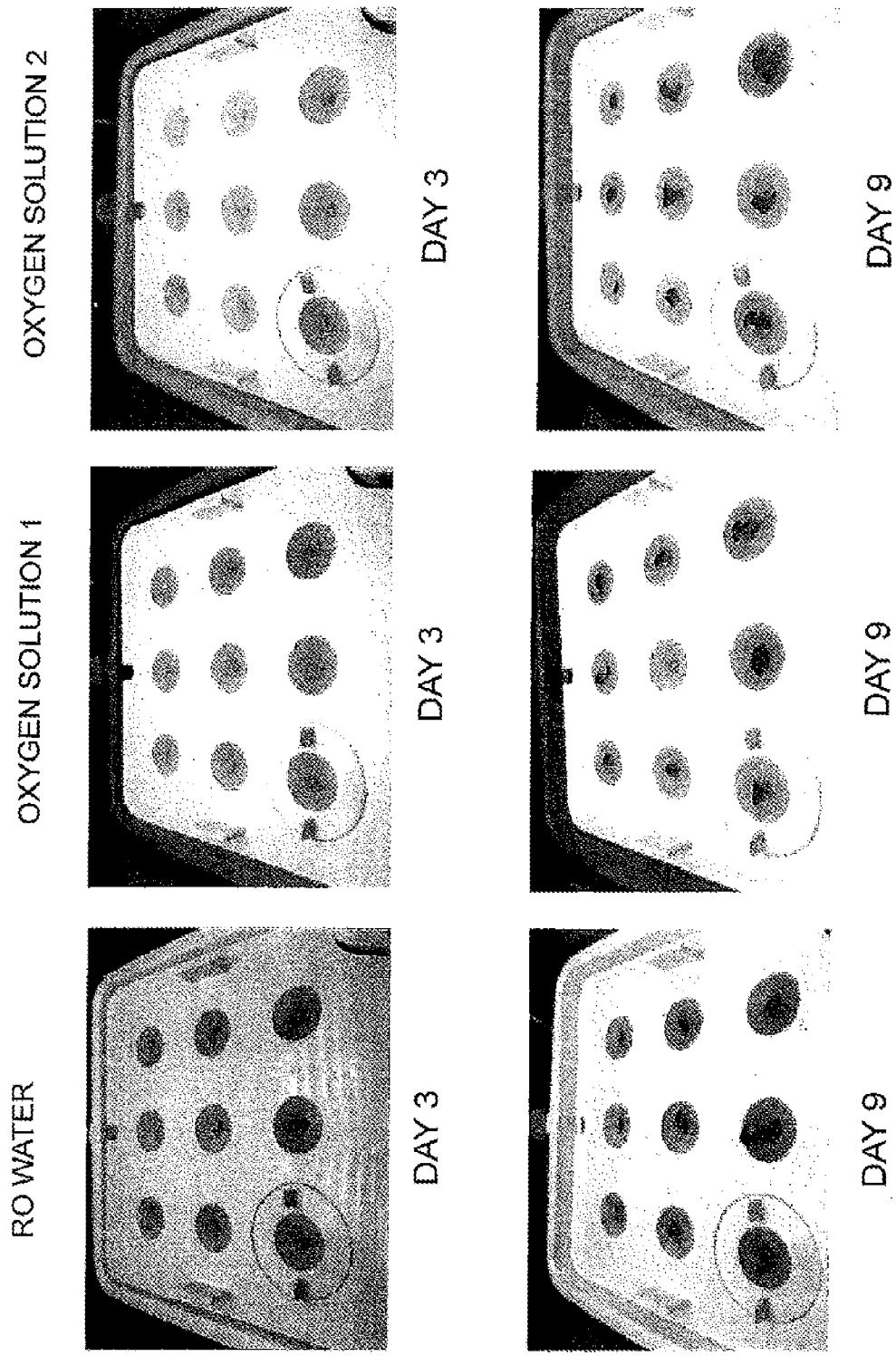
FIG. 5 is photographs showing the growth states of day 3 and day 9 after the start of cultivation of sweet basil.
Figure 6:
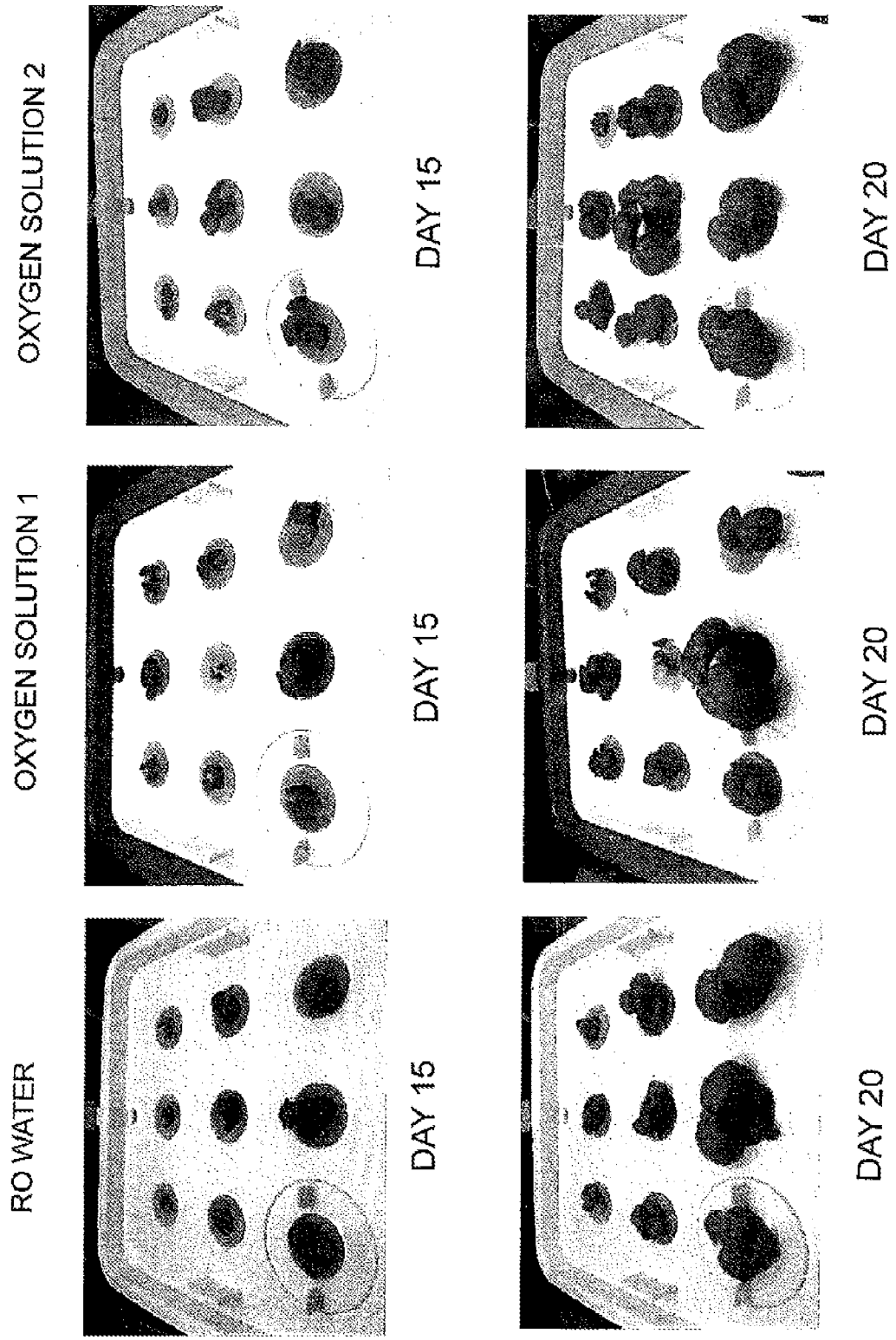
FIG. 6 is photographs showing the growth states of day 15 and day 24 after the start of cultivation of sweet basil.
Figure 7:
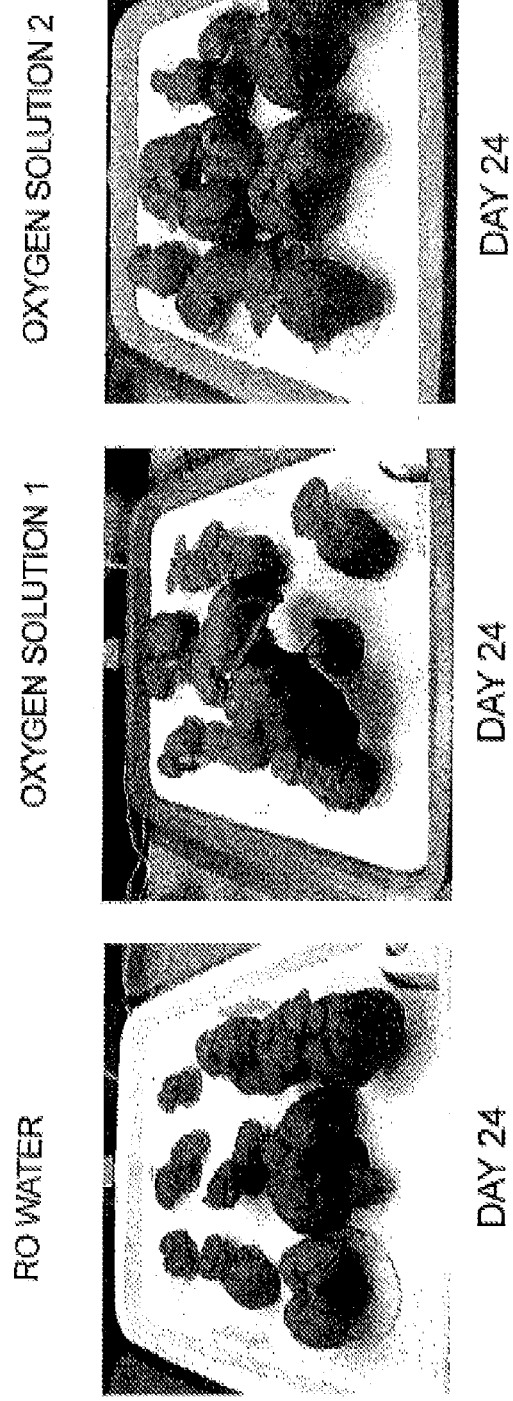
FIG. 7 is photographs showing the growth states of day 24 after the start of cultivation of sweet basil.
Figure 8:
FIG. 8 is photographs showing the growth states of day 34 after the start of cultivation of sweet basil.
Figure 8:
Figure 8:
Figure 8:
Figure 8:
Figure 8:

The results are shown in Table 2 and FIG. 4.

TABLE 2

|  | Fluorescence method (DO value) | Carbohydrazide method (CH value) | (CH − DO) value |
| --- | --- | --- | --- |
| Before heating | 39.7 ppm | 96.2 ppm | 56.5 ppm |
| After heating | 13.1 ppm | 68.0 ppm | 54.9 ppm |

As shown in Table 2 and FIG. 4, in the oxygen solution before the heating, the oxygen amount was 39.7 ppm by a fluorescence method (DO value), and 96.2 ppm by a carbohydrazide method (CH value), and it was confirmed that the oxygen clathrate hydrates formed by oxygen molecules and water molecules were contained in an amount of 56.5 ppm (CH value−DO value).

On the other hand, in the oxygen solution after the heating, the oxygen amount was 13.1 ppm by a fluorescence method (DO value), and 68.0 ppm by a carbohydrazide method (CH value), and it was confirmed that the oxygen clathrate hydrates were contained in an amount of 54.9 ppm (CH value−DO value). That is, in the oxygen solution, although the measurement value (DO value) by a fluorescence method was lowered as a result of the release of the dissolved oxygen that had not been in a form of an oxygen clathrate hydrate by heating, there was no significant change in the (CH−DO) values, therefore, it was confirmed that the oxygen clathrate hydrates in the oxygen solution were maintained in a state of being dissolved in water without being released in the atmospheric air even by a heat treatment at 100° C.

<Example 3> Investigation of Plant Growth Promotion Effect

The following three types of water, oxygen solutions 1 and 2 were prepared.

(1) RO water, which was obtained via a reverse osmosis membrane (DO value: 9.4 ppm/CH value: 9.5 ppm)

(2) Oxygen solution 1 after heating (100° C., 3 minutes), which was obtained in Example 2 (DO value: 13.1 ppm/CH value: 68.0 ppm)

(3) Oxygen solution 2, which was produced by setting the pressure of the gas-liquid mixing pump to be lower than the condition of Example 2 (DO value: 4.1 ppm/CH value: 54.3 ppm after heating (100° C., 3 minutes))

Further, by using a commercially available hydroponic cultivation apparatus, seeds of sweet basil were sown on a sponge of the cultivation apparatus, and each sweet basil was cultivated by mixing a liquid fertilizer in the RO water, or the oxygen solution 1 or 2 (room temperature 10° C. to 20° C.). Furthermore, the water level was observed by a water level float, and when the water level was lowered, the RO water, or the oxygen solution 1 or 2 was added. With regard to the lighting, the light was turned on from 6:00 am to 10:00 pm (ON for 16 hours, and OFF for 8 hours), and a light-shielding cover was put on for the same conditions.

FIGS. 5 to 8 are photographs showing the growth states after the lapse of 3 days to 34 days from the start of the cultivation of the sweet basil.

As shown in FIGS. 5 to 8, it was confirmed that after germination, the sweet basil cultivated by oxygen solution 1 grew quickly after the leaves had come out, and the sweet basil, which was cultivated by the oxygen solution 1 or 2, grew significantly at the time of harvesting (day 34).

Accordingly, it was confirmed that the oxygen solutions 1 and 2 are excellent in the plant growth promotion effect, and can be utilized as a liquid for plant cultivation.

REFERENCE SIGNS LIST

1 RO water storage tank
2 Oxygen supply cylinder
3 Gas-liquid mixing pump
31 Rotor
31a Rotor blades
32 Housing
32c Partition walls
4 Gas-liquid separator
41 Inflow port
42 Outflow port
43 Partition plate
44 Communication part
45 Discharge part
R1 First chamber
R2 Second chamber
5 Water storage tank

The invention claimed is:

1. An oxygen solution, comprising an oxygen clathrate hydrate comprising dissolved oxygen that is maintained in a state of being dissolved in a solution when heated to 100° C. under ambient pressure, wherein the amount of the dissolved oxygen is 50 ppm or more, and wherein the amount of dissolved oxygen is determined by difference (P1−P2) between a numerical value P1 of an amount of dissolved oxygen (ppm) measured by a dissolved oxygen measurement method comprising the steps of:

(1) adding a deoxidizing amino compound to an oxygen solution, and heating the resultant mixture at a temperature of 80° C. or more;

(2) measuring a concentration of the deoxidizing amino compound contained in the oxygen solution after the step (1); and (3) calculating an amount of dissolved oxygen contained in the oxygen solution before passing through the step (1) from the concentration of the deoxidizing amino compound measured in the step (2), and a numerical value P2 of an amount of dissolved oxygen (ppm) of an oxygen solution measured by a dissolved oxygen measurement method of any one of a diaphragm process, a fluorescence method, and a Winkler method.

2. An ice, obtained by freezing the oxygen solution according to claim 1.

* * * * *